(12) United States Patent
McMenamy et al.

(10) Patent No.: US 10,806,134 B2
(45) Date of Patent: Oct. 20, 2020

(54) THREE-AXIS ADJUSTABLE ROD HOLDER

(71) Applicants: James Robert McMenamy, Clackamas, OR (US); James Bruce McMenamy, Clackamas, OR (US)

(72) Inventors: James Robert McMenamy, Clackamas, OR (US); James Bruce McMenamy, Clackamas, OR (US)

( * ) Notice: Subject to any disclaimer, the term of this patent is extended or adjusted under 35 U.S.C. 154(b) by 0 days.

(21) Appl. No.: 16/584,675

(22) Filed: Sep. 26, 2019

(65) Prior Publication Data
US 2020/0100486 A1  Apr. 2, 2020

Related U.S. Application Data

(60) Provisional application No. 62/737,760, filed on Sep. 27, 2018.

(51) Int. Cl.
*A01K 97/10* (2006.01)
*B63B 17/00* (2006.01)

(52) U.S. Cl.
CPC .............. *A01K 97/10* (2013.01); *B63B 17/00* (2013.01)

(58) Field of Classification Search
CPC ......... A01K 97/10; A01K 97/11; G09F 17/00; Y10T 403/7105; B63B 17/00
USPC ............. 248/511, 514, 515, 540, 541, 230.1, 248/230.2, 230.5, 229.1, 229.14
See application file for complete search history.

(56) References Cited

U.S. PATENT DOCUMENTS

| 4,586,688 | A | * | 5/1986 | Hartman | A01K 97/10 248/538 |
|---|---|---|---|---|---|
| 4,827,654 | A | * | 5/1989 | Roberts | A01K 97/10 248/514 |
| 5,184,797 | A | * | 2/1993 | Hurner | A01K 97/10 248/515 |
| 5,313,734 | A | * | 5/1994 | Roberts | A01K 97/10 248/514 |
| 7,232,099 | B1 | * | 6/2007 | Wilcox | B63B 25/002 248/228.1 |
| 7,908,786 | B2 | * | 3/2011 | Bailey | A01K 97/10 43/16 |
| 8,156,681 | B2 | * | 4/2012 | Carnevali | A01K 97/10 43/21.2 |
| 8,453,373 | B2 | * | 6/2013 | Gordon | A01K 97/10 43/21.2 |
| 10,182,564 | B2 | * | 1/2019 | Tuck | A01K 97/10 |
| 2018/0271078 | A1 | * | 9/2018 | George | A01K 97/10 |

* cited by examiner

*Primary Examiner* — Steven M Marsh

(57) ABSTRACT

An adjustable bracket that clamps onto a first axis includes a rod defining a second, orthogonal axis upon which a pivot block is mounted. The pivot block includes two perpendicular splined apertures which may receive a fishing rod holder that has a splined shaft to fix the azimuth orientation of the rod holder in the pivot block. The fishing rod holder has a clevis which receives a perforated ear of a rod retaining tube. A fastener clamps the retaining tube in the clevis at a desired elevation angle. The retaining tube has other features which may coddle a reel mounted on a fishing rod. The azimuth options of the spline interface and the elevation adjustment of the clevis joint provide second and third adjustable axes for orienting a fishing pole from an attachment point on any railing or stanchion or post on a vessel.

13 Claims, 2 Drawing Sheets

THREE-AXIS ADJUSTABLE ROD HOLDER

CROSS REFERENCE TO RELATED APPLICATION

This non-provisional utility application claims the benefit of and priority to U.S. Provisional Patent Application 62/737,760 "Three-Axis Adjustable Rod Holder," filed 27 Sep. 2018. The entire content of U.S. Provisional Patent Application 62/737,760 "Three-Axis Adjustable Rod Holder," filed 27 Sep. 2018 is hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates adjustable mounting of fishing poles on railings, stanchions, poles or other tube structures of a vessel.

BACKGROUND

People who fish from boats using fishing poles often want to support and fix a fishing pole at a certain elevation and azimuth so it will remain in position while the fishermen do other things with their hands. Most available devices offer limited options or angular ranges of adjustment. Devices which retain a fishing rod and which are designed to attach to a gunwhale of a vessel, and devices designed to permanently attach to a vessel, especially those which require drilling of holes or permanent fasteners such as wood screws are outside the scope of the invention.

BRIEF SUMMARY

The invention relates to adjustable mounting of fishing poles on railings, stanchions, poles or other tube structures of a vessel. Most available devices offer limited options or angular ranges of adjustment. Railings, stanchions or other tube structures afford attachment sites for fishing pole holders adapted to clamp to tubes, but these tube structures, being shaped in accordance with their primary functions (e.g a railing to prevent falls overboard, a spar, boom, or stanchion which acts as a flagpole or a mast for a hoist, etc.) may not be well oriented to support a clamp at an advantageous or a preferred angle for supporting a fishing pole. For example, many railings along the perimeter of a hull continue the flare of the hull of the vessel, mostly for styling. Most vessels have some degree of flare above the waterline. Advantages of hull flare may include improvements in stability, splash, and wash suppression. The opposite condition from flare, that is, where the hull becomes narrower abeam with increasing height above the waterline, is called tumblehome.

In either condition railings are unlikely to include a section of tubing substantially perpendicular to the water, and most clamps designed to hold fishing poles or holders for fishing poles to a tube of a vessel railing constrain at least one axis of rotation available for positioning the rod or rod holder to be parallel to the tube gripped by the clamp. For flared hulls which are most common, this means that the positioning axis for the rod or rod holder inclines away from the user so that if the rod holder is rotated in such a device the height of the rod tip above water is often not only not constant throughout its subtended arc, but deleteriously drops as the rod is oriented perpendicular to the railing.

Thus a primary objective of the invention is to offer a product or device which may clamp to a railing or stanchion at any available angle and offer a pivot axis which may be adjustably inclined toward or away from the user to orient the pivot axis to be perpendicular to the water regardless of the angle of the railing with respect to the water.

Hobby or sport fishers may not own their own boats and thus another objective of the invention is that it should be non-permanently attachable and detachable with common tools and hardware, and should not require drilling, holes, cutting, or other permanent modifications in order to install the device on a boat not owned by a user of the invention. Permanent damage or alterations such as by wood screws, self-tapping screws that bite holes into structural members, or the like are thus preferably rendered unnecessary by the invention.

Manufacturers and designers of other accessories used in fishing and pleasure boating have been coalescing around distinct sizes and shapes for arbors or spindles which extend from these accessories as attachment affordances, and receiving apertures in bezels, brackets, or other structures of various craft, so that these accessories may be installed at a number of sites on a vessel and moved from site to site as is convenient. It is therefore another objective of the invention to receive such standardized or commonly produced attachment affordances current within the industry so that the invention may be used with fishing rod holders or may optionally include a fishing rod holder as a portion of its components in an assembly.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION of CERTAIN EMBODIMENTS

Figure 1:
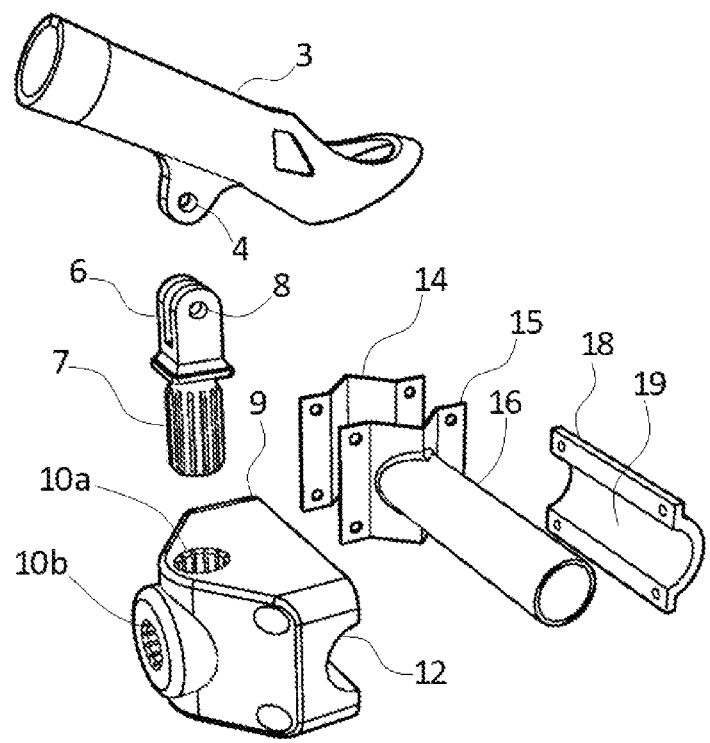
FIG. 1 shows an exploded view of the components of an assembly in accordance with the invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Also in this specification, this specification any singular grammatical gender may subsume any other singular grammatical gender in all cases, and any plural grammatical gender may subsume any other plural grammatical gender in all cases. A user of the invention may be of any biological sex, thus all instances where "he," "his," or "him" are written may be replaced by "she," or "her," as appropriate, to equivalent meaning, effects, intents, and purposes. Also, grammatically irregular plural forms are recognized as their plain language equivalents, so that terms such as "at least one foot" are understood to be equivalent to "both feet" and other similar phrases of equivalent meaning. "A fisherman" or "fishermen" as used in this specification includes a person or persons of any sex. The word "sex" refers to biological makeup and the word "gender" refers only to grammatical terms and structures.

The invention comprises an adjustable fishing pole positioning assembly whereby a fishing pole may be positioned at any desired azimuth and elevation angle by means of adjustments made along three adjustable axes. An adjustable bracket that clamps onto a first axis includes a rod defining a second, orthogonal axis upon which a pivot block is mounted. The pivot block includes two perpendicular splined apertures which may receive a fishing rod holder that has a splined shaft to fix the azimuth orientation of the rod holder in the pivot block.

The fishing rod holder has a clevis which receives a perforated ear of a rod-retaining tube. A fastener clamps the retaining tube in the clevis at a desired elevation angle. The retaining tube has other features which may coddle a reel mounted on a fishing rod. The azimuth options of the spline interface and the elevation adjustment of the clevis joint provide second and third adjustable axes for orienting a fishing pole from an attachment point on any railing or stanchion or post on a vessel.

FIG. 1 shows an exploded view of the components of a fishing rod positioning assembly in accordance with the invention. It is designed to clamp onto a round tube portion or structure on a boat such as a formed railing or a stanchion. Tube elements are also found on pontoon boats.

The clamp comprises two components, a first plate [14] having a first vee groove and a first plurality of apertures, and a second plate [15] having a second vee groove and a second plurality of apertures complementary to the first plurality of apertures. As will be seen in later figures, these apertures may accept in them a set of threaded fasteners so the two parts of this clamp may grip onto a substantially straight portion of a structural tube. Also in this specification, holes are called "apertures."

The second plate has a section of round bar [16] extending therefrom which defines a first axis of adjustment for a pivot block [9] and its pivot block clamp [18.] The pivot block has an aperture [10a] that defines a second axis of adjustment where the fishing rod holder is inserted. The pivot block shown has another such aperture [10b] so it may be oriented differently on the bar [16] and offer an alternative hole for receiving a fishing rod holder. More than one such alternative hole may be formed in the pivot block. In this embodiment shown, the pivot block has a first aperture and a second aperture defining an alternate second adjustment axis.

The pivot block also has a groove [12] having an arcuate cross section which is complementary to the bar [16] of the second clamp plate [15.] The pivot block clamps onto the bar by cooperating with a pivot block clamp [18] also having a groove [19] which is complementary to the bar of the second clamp plate. The pivot block also includes a plurality of through holes (through apertures) complementary to a plurality of through holes (through apertures) in the pivot block clamp. When the pivot block clamp is aligned with its groove coaxial to the groove of said pivot block, then all the through holes may be aligned in mutual registration. Threaded fasteners may be passed through the aligned sets of holes and when a desired orientation of the pivot block on the bar is achieved, these fasteners may be tightened to preserve that particular orientation. The fasteners may be tightened snug enough to support a fishing pole in its caddy but also loose enough so that the clamping friction onto the bar may be overcome by a user and the pivot block may thus be pivoted without using tools to loosen and retighten it. Wing nuts may also be included among the threaded fasteners for clamping a pivot block to its pivot block clamp so that the clamping pressure and friction between these two components of the assembly may be adjusted without tools.

In this embodiment a fishing pole caddy is comprised of two parts which are a spindle [6] and a fishing pole holder [3.] The spindle has two ends, with a first end optionally comprising splines or at least one slat [7] which may also be one of a partial or complete set of splines emerging as positive features from the cylindrical surface of the spindle.

The one or more apertures in the pivot block for receiving a spindle of a fishing rod caddy will usually include internal splines, longitudinal grooves, or other negative features which receive the slat or the one or more splines or positive features on the first end of the spindle. The slat is thus complementary to at least one longitudinal groove in the aperture of the pivot block. The orientation of the fishing rod may be adjusted in increments along the second adjustment axis by removing the spindle from a splined hole in the pivot block and indexing the spindle features, such as its own splines, or the slat so that they align with the next receiving negative feature in the radial array of such features which constitute a splined hole, and then inserting the now indexed spindle into the splined hole in the pivot block.

The other end or second end of the spindle comprises a clevis having a receiving slot and a transverse through-hole [8] (also called a through-aperture) that defines a third adjustment axis. The fishing pole holder [3] has tube section with an ear that has an aperture [4.] The ear is complementary to and fits into the receiving slot of the clevis. The through holes [8] in the clevis and the ear may be aligned so that threaded hardware such as a bolt and a nut may be passed through the aligned holes and be tightened to fix the angle of the fishing rod holder with respect to the axis of the spindle. Adjusting this angle is the most common method of setting the tip of the fishing rod to a desired height above the water. An alternative method is to rotate the pivot block around the bar of the second plate of the clamp.

To clamp the fishing rod positioning assembly to a section of tube structure on a boat, the first vee groove of the first plate is aligned parallel with said second vee groove of the second plate and the both are fitted up to a site on a structural tube or stanchion. The vee grooves on the plates cooperate so that they may clamp onto tubes of other sectional shapes including oval cross sections and even some square and rectangular railings. The first and second plates of the clamp have first and second pluralities of apertures (holes) in them so they may be aligned and receive threaded hardware such as bolts and nuts. When the first vee groove of the first plate is aligned facing opposite the second vee groove of the second plate, a first set of holes in the first clamp plate may be aligned in registration with the second set of holes in the second plate. In this specification, the phrase a "set of holes" is equivalent to the phrase a "plurality of apertures," so a first plurality of apertures in the first clamp plate may be aligned in registration with a second plurality of apertures in the second plate. The phrase "facing opposite" when referencing a pair of objects each having a groove or a channel means that the axes of the two grooves or channels are substantially parallel with each other, that is, one axis is within 15° of theoretical parallel with the other, and that the objects are oriented so that the rims of the grooves or channels are proximal to each other.

In most cases, such as when fitting onto round tubes, the bar of the second clamp plate will extend perpendicular to the central axis of the tube to which it is clamped. The bar defines an axis perpendicular to the vee groove in its plate. In this specification the phrase "perpendicular" shall be taken to mean that a first feature, such as an axis or an edge or a planar face of an object is within 15° of theoretical perpendicular with the other axis or an edge or a planar face being compared.

Figure 2:
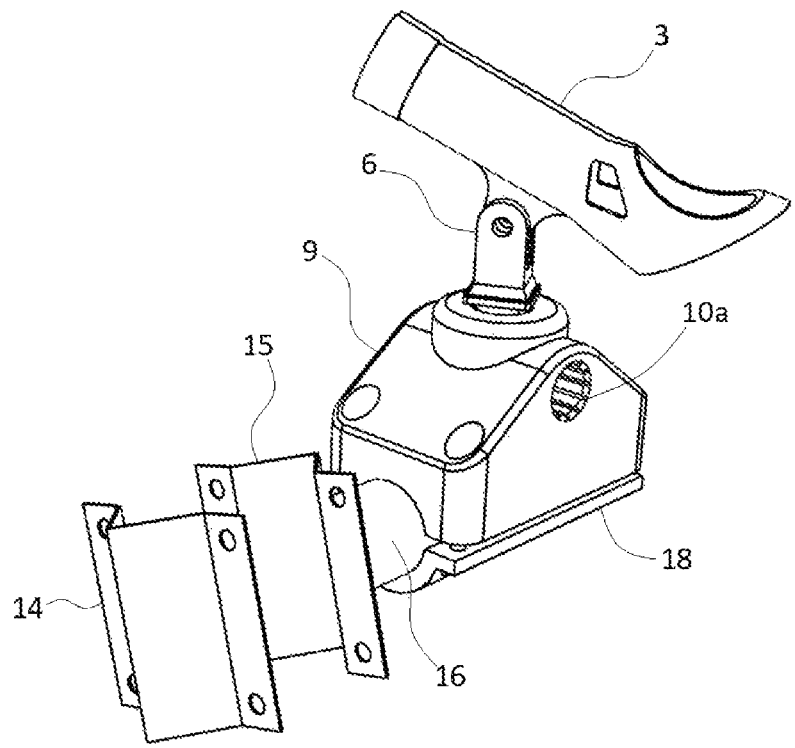
FIG. 2 shows a view of an alternate configuration of components of an assembly in accordance with the invention, with only one clamp component exploded away from the rest of the components of the assembly.

FIG. 2 shows a view of an alternate configuration of components of an assembly in accordance with the invention, with only one clamp component, the first clamp plate [14] exploded away from the rest of the components of the assembly. The vee groove of the first clamp plate is aligned and registered with the vee groove in the second clamp plate [15.] The vee grooves are shown here at an arbitrary angle as they would be when clamping to an angled stanchion or a section of tubing that is sloped away from vertical, such as a railing following the flaring along the perimeter of a boat hull.

The groove features of the pivot block [9] and pivot block clamp [18] fit up to the bar [16] extending from the second clamp plate [15] of this embodiment in accordance with the invention. The pivot block [9] is oriented with its alternate splined hole [10b in FIG. 1] nearly vertical and the spindle [6] of the fishing pole caddy is received into that splined hole. The other splined hole [10a] is visible in this figure. The fishing pole holder [3] is received into the clevis portion of the spindle and the through-hole in the clevis aligns with a hole in an ear portion of the fishing pole holder. A threaded fastener (not shown) such as a screw and nut may be passed through these aligned holes and tightened to hold a fishing pole in its holder at a desired angle. The clevis may also include a slot or a hexagonal pocket at its fastener receiving hole so that it may prevent a hex head screw or bolt inserted therein from turning. A nut such as a wing nut may then be tightened by hand by a user of moderate strength.

Figure 3A:
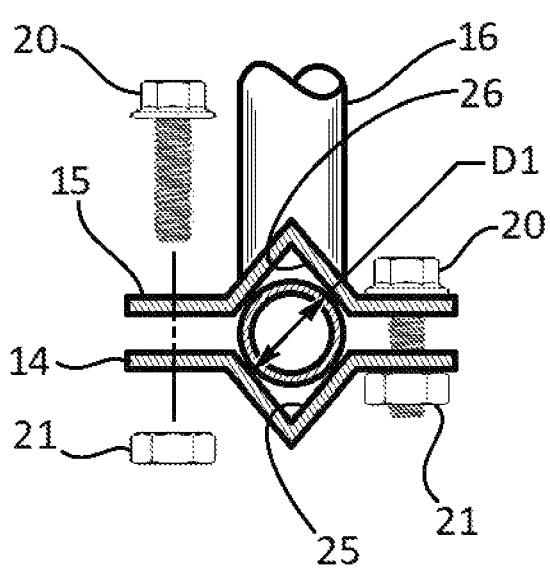
FIG. 3a shows a cross section of plates of a clamp assembly in accordance with the invention and also shows a bar of a clamp plate of said assembly.
Figure 3B:
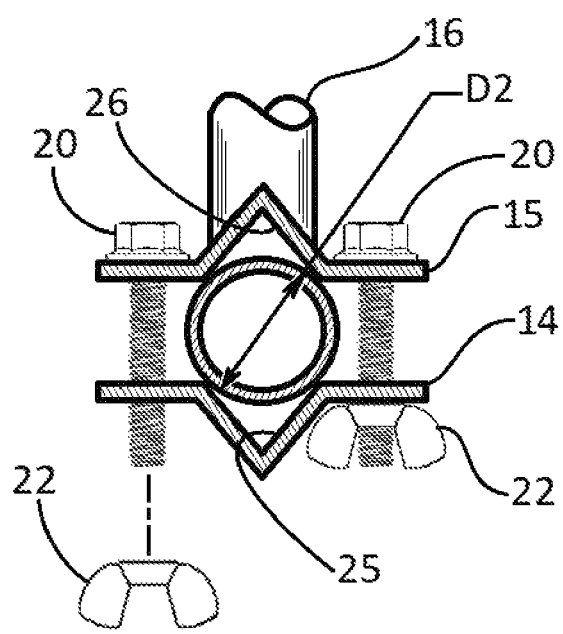
FIG. 3b shows another cross section of plates of a clamp assembly in accordance with the invention and also shows a bar of a clamp plate of said assembly.

Most pontoon boats are fitted with railings formed from round tubes of a known range of diameters, and the vee grooves are adapted to fit up to tubes within this range. FIGS. 3a and 3b explain fitting the clamp plates of the invention to tubes in greater detail. FIG. 3a shows a cross section of first and second plates [14, 15] of a clamp assembly in accordance with the invention, and also shows a bar [16] extending from the second clamp plate of the assembly. In this figure the plates are clamped onto a round tube of a smaller diameter [D1] which comprises part of a railing or a tube structure on a boat. The interior surfaces of the vee grooves [25] and [26] are aligned to the railing tube and centered to it. Threaded fasteners which in this case are hex bolts [20] and nuts [21] pass through sest of holes (first and second pluralities of apertures) in the first and second clamp plates. Thus the first plate may be secured to the second plate by means of threaded fasteners passing through first and second pluralities of apertures in said first and second plate. Thus the pivot block clamp of the fishing rod positioning assembly may be secured to the pivot block by means of threaded fasteners passing through pluralities of apertures in the pivot block and the pivot block clamp.

Various types of washers including lock washers may also be used with these threaded fasteners but they are not shown in this figure. One threaded fastener set is shown exploded and another set is shown drawn up tight.

FIG. 3b shows another cross section of the same clamp assembly components as seen in FIG. 3a, but as shown in this figure they are fitted up to a round tube of a larger diameter [D2.] The same sized interior vee groove features [25] and [26] grip the larger bar to equivalent effect as for the smaller tube in FIG. 3a. Thus the cooperating vee grooves may clamp upon the anticipated range of tube diameter sizes commonly used on pontoon boats and other small craft used for fishing in sports and leisure. As in FIG. 3a, threaded fasteners [20] pass though complementary sets of holes in the clamp plates [14, 15] which become aligned when both vee grooves are fitted up to a round structural tube for clamping. Longer fasteners may be used for larger diameter tubes, and in this figure the fasteners complementary to the bolts are wing nuts [22] which may be tightened by hand so that the invention may be installed without using tools.

Although in this embodiment the bar [16] extends perpendicularly away from the railing tube and defines an adjustment axis also perpendicular to the railing tube this is not a necessary condition and other embodiments exist within the scope of the invention wherein the bar extends in a non-perpendicular direction convenient for particular railings or stanchions on other particular vessels.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A fishing rod positioning assembly comprising:
a clamp comprising
a first plate having a first vee groove and a first plurality of apertures,
a second plate having
a second vee groove and a second plurality of apertures complementary to said first plurality of apertures
a bar extending from said second plate defining a first axis of adjustment,
a pivot block having an aperture defining a second axis of adjustment, and also having a groove complementary to said bar of said second plate,
a pivot block clamp also having a groove complementary to said bar of said second plate, and
a spindle having first and second ends, with said second end comprising a clevis having a receiving slot and a transverse through aperture defining a third adjustment axis, and
a fishing pole holder having an ear, said ear further comprising an aperture, with said ear complementary to said receiving slot of said clevis.

2. The fishing rod positioning assembly of claim 1, wherein said first vee groove of said first plate is aligned parallel with said second vee groove of said second plate when said first plurality of apertures in said first plate is aligned in registration with said second plurality of holes in said second plate.

3. The fishing rod positioning assembly of claim 1, wherein said first vee groove of said first plate is aligned facing opposite to said second vee groove of said second plate when said first plurality of apertures in said first plate is aligned in registration with said second plurality of holes in said second plate.

4. The fishing rod positioning assembly of claim 1, wherein said aperture in said pivot block further comprises longitudinal grooves.

5. The fishing rod positioning assembly of claim 4, wherein said second end of said spindle further comprising at least one slat complementary to any one longitudinal groove in said aperture in said pivot block.

6. The fishing rod positioning assembly of claim 5, wherein said aperture of said pivot block is a first aperture, and said pivot block further comprises a second aperture defining an alternate second adjustment axis.

7. The fishing rod positioning assembly of claim 1, wherein said bar of said second plate defines an axis perpendicular to said vee groove in said second plate.

8. The fishing rod positioning assembly of claim 1, with said first plate secured to said second plate by means of threaded fasteners passing through said first and second pluralities of apertures in said first and second plate.

9. The fishing rod positioning assembly of claim 1, further comprising a wing nut.

10. The fishing rod positioning assembly of claim 1, wherein said pivot block further comprises a plurality of through apertures complementary to a plurality of through apertures in said pivot block clamp.

11. The fishing rod positioning assembly of claim 10, wherein with said pivot block clamp aligned with its groove coaxial to said groove of said pivot block, said plurality of through apertures in said pivot block also align registration with said second plurality of apertures in said pivot block clamp.

12. The fishing rod positioning assembly of claim 10, wherein said pivot block clamp is secured to said pivot block by means of threaded fasteners passing through said pluralities of apertures in said pivot block and said pivot block clamp.

13. The fishing rod positioning assembly of claim 12, further comprising a wing nut.

* * * * *